Patented Sept. 11, 1951

2,567,569

UNITED STATES PATENT OFFICE 2,567,569

PERFLUORINATION OF HYDROCARBONS WITH LEAD TETRAFLUORIDE

Earl T. McBee, West Lafayette, Ind., and Richard Marion Robb, Wilmington, Del., assignors to Purdue Research Foundation, West Lafayette, Ind., a corporation of Indiana No Drawing. Application December 19, 1944, Serial No. 568,939

3 Claims. (Cl. 260—653)

This invention relates to a method for preparing perfluoro organic compounds and to the perfluoro compounds so obtained. This application is a continuation-in-part of our copending application Serial 552,016 filed August 30, 1944, issued December 5, 1950, as Patent No. 2,533,132.

Conventional procedures for the production of fluorine containing organic compounds have involved the treatment of organic compounds containing chlorine, bromine, or iodine with fluorinating agents such as HF, $SbF_3$, $HgF_2$, etc., which under certain conditions tend to displace at least a portion of the established halogen with fluorine. Such methods of operation have not been particularly satisfactory by reason of difficulties in the preparation of many of the chloro, bromo, or iodo compounds necessarily employed as reactants, and the tendency of such fluorinating agents to displace a part only of the established halogen whereby desired fluoro derivatives, particularly perfluoro compounds, have not been readily obtainable.

It is recognized that fluorine is dissimilar to chlorine and bromine as regards its use in direct halogenation. This gas tends to react with many organic materials with explosive violence. Most metal fluorides are unsatisfactory for ordinary exchange or double decomposition reactions because, under the conditions necessary to obtain an exchange of halogen, they tend to produce undesirable by-products, such as those formed by decomposition or polymerization, and do not always give uniform or complete displacement of halogen other than fluorine in organic compounds. Bromine trifluoride, chlorine trifluoride, and iodine pentafluoride, all of which have been employed in the preparation of fluorine derivatives, are frequently explosive on contact with or in admixture with organic materials. Also, these substances have been found to operate as brominating, chlorinating, or iodinating agents on occasion, whereby indeterminate mixtures of halogenated organic compounds are obtained.

A further shortcoming of each of the foregoing substances resides in their comparative inoperativeness in fluorinating hydrocarbons or other halogen-free organic compounds. The required presence of chlorine, bromine or iodine in the structure of organic reactants employed in most fluorinating operations complicates the problem of the recovery, purification, and analysis of reaction products. Except for the metal fluorides, most known fluorinating agents are liquids or gases under recommended conditions of operation, necessitating the use of specialized equipment to handle them and, by reason of the vigorous nature of the reaction as carried out therewith, meticulous control of operating temperatures and pressures, and the utilization of special safety measures to guard against fire and explosion hazards. The expense and inconvenience of the special features of operation heretofore required have contributed materially to the slowness of development of the art of organic fluoro compounds. The need for new and improved procedures of fluorination is evident.

It is among the objects of the present invention to provide a fluorination method which will not be subject to the disadvantages as set forth above. A further object is to supply a fluorinating agent for producing perfluoro organic compounds which is less hazardous than those previously known. Another object is to supply an improved procedure whereby the use of chlorinated, brominated, or iodinated intermediates will not be essential for the preparation of perfluoro organic compounds. An additional object is to provide a method whereby perfluoro organic compounds may be prepared from partially or completely chlorinated, brominated or iodinated intermediates or from partially fluorinated organic compounds. A further object contemplates the provision of a novel fluorinating agent. An additional object is to supply an improved method for the preparation of perfluoro organic compounds whereby the decomposition of the organic reactant and of the desired end product is substantially avoided. A further object is to provide a method for the preparation of fluorocarbons. Another object is to provide a procedure for the production of fluorocarbons wherein a halohydrocarbon, containing attached directly to carbon at least one atom of hydrogen or of halogen other than fluorine, is employed as a reactant. Another object is to provide novel perfluoro and/or fluorocarbon compounds. Other objects will become apparent from the following specification and claims.

According to the present invention, perfluorination is accomplished and perfluoro compounds are obtained by contacting an organic compound, containing an unsaturated carbon-carbon linkage or at least one hydrogen atom or halogen atom other than fluorine attached to carbon, with lead tetrafluoride as an active fluorinating agent under such conditions and for such time that all of such unsaturated linkages are saturated with fluorine and all hydrogen or halogen other than fluorine in the compound is replaced by fluorine. In certain instances rupture of the organic molecule may occur with the formation of perfluoro organic compounds containing a fewer number of carbon atoms than the compound fluorinated. This may be described as perfluorination.

Lead tetrafluoride is a solid compound prepared conveniently by treating lead dichloride with anhydrous hydrogen fluoride at about 200° centigrade to produce lead difluoride, and thereafter contacting the lead difluoride with fluorine at a temperature of about 200° centigrade or higher. Lead tetrafluoride is substantially stable at temperatures as high as 600° centigrade. The fluorinating action exerted by lead tetrafluoride at reaction temperatures results in the substitution of fluorine for replaceable hydrogen directly attached to carbon, the addition of fluorine to unsaturated carbon linkages, and the replacement of halogens other than fluorine present in the compound. Lead difluoride and, generally, hydrogen fluoride are by-products of reactions in which the new fluorination agent is employed. The lead tetrafluoride may be regenerated conveniently from the by-product difluoride by contacting the latter with gaseous fluorine at temperatures above about 200° centigrade, and, desirably, without removing the lead difluoride from the fluorination reactor.

Lead tetrafluoride is a powerful fluorinating agent for organic compounds generally. Processes embodying the use of lead tetrafluoride as the active fluorinating agent avoid many of the objectionable features heretofore characteristic of fluorination operations. The explosion hazard when working with lead tetrafluoride is negligible even though the reaction is exothermic. However, in spite of the less vigorous action exerted by lead tetrafluoride, perfluorination is obtained in accordance with the procedures set forth. It has also been observed that a minimum of decomposition and degradation or of polymerization of reactants results during fluorination with lead tetrafluoride, provided that a definite relationship be maintained between reaction temperatures and temperatures of decomposition of organic reactant and intermediate products.

The operability of chlorine-, bromine-, and iodine-free organic compounds as reactants avoids the necessity for producing these halo analogues as a preliminary step to obtaining the desired perfluoro compounds. Where a chloro, bromo, or iodo organic compound is employed as a reactant, the new practice provides a way of avoiding the formation of mixed halo derivatives in which a portion only of the chlorine, bromine, or iodine has been displaced by fluorine, in that lead tetrafluoride is adapted to replace completely such halogen and any remaining hydrogen to give maximum yields of perfluoro compounds. Where a partially fluorinated or other halogenated hydrocarbon or other organic compound is employed as a reactant, the presence of fluorine atoms usually increases the stability of the reactant whereby perfluoro compounds are obtained with a minimum of decomposition and disintegration in the fluorinating zone.

In operating in accordance with the invention, any desired hydrocarbon, halo-hydrocarbon, ether, ester, ketone, alcohol, et cetera may be employed, whether aliphatic or aromatic in nature, provided only that such compound is unsaturated or contains at least one hydrogen atom or halogen atom other than fluorine directly attached to carbon. The invention is carried out by contacting such organic compound in liquid or vapor phase with solid lead tetrafluoride at a temperature and for a time sufficient to accomplish perfluorination. Any suitable corrosion resistant apparatus may be employed, whether of pressure type construction or otherwise. By "corrosion resistant" is meant resistant to the action of lead tetrafluoride, hydrogen fluoride and other by-products formed during the reaction and of fluorine when it may be passed through the reactor for the regeneration of lead tetrafluoride. If desired, an inert substance may be employed as a diluent for the organic reactant or, in the case of perfluorination in the liquid state, as a dispersing medium for the solid lead tetrafluoride. Preferred inert substances include fluorocarbons, anhydrous hydrogen fluoride, nitrogen, and helium.

The preferred method of operation resides in contacting the organic compound in gaseous phase with solid lead tetrafluoride. For difficultly volatilizable compounds the liquid phase may be used. The vapor phase operation is conveniently accomplished by passing the vaporized organic reactant over a train of lead tetrafluoride and collecting the perfluoro reaction products. A satisfactory result is obtained when a metal tube or reactor of other type is packed with lead tetrafluoride in finely divided form and the vapors of the selected organic compound are passed therethrough at reaction temperatures. When operating in this fashion, the reaction product is usually collected outside the reaction zone by condensing the effluent gases.

When operating in the gaseous or vapor state, the organic compound employed as reactant may simply be vaporized by boiling and the vapors led into the reaction zone. A convenient method of operation and one which aids in maintaining a continuous movement of the organic reactant and product through the lead tetrafluoride includes bubbling a stream of an inert gas, such as nitrogen or helium, through the liquid organic reactant at temperatures approaching the vaporization or boiling temperature of the latter, and passing the mixed gases through the lead tetrafluoride-containing reaction zone. An alternate procedure includes pre-mixing vapors of the reactant with an inert gas in a gasometer or similar equipment. Also the organic reactant in liquid phase may be introduced portionwise into the reaction zone maintained at such a temperature as to cause volatilization. A further procedure includes the use of reduced pressure to aid in the vaporization of the organic substance, especially when high boiling substances are used.

When operating in the liquid phase, the organic liquid which is to be fluorinated and the lead tetrafluoride may simply be mixed together and the mixture heated to the desired temperature. In some instances the heated organic liquid may be passed through a reaction vessel containing lead tetrafluoride. Since the reaction is usually exothermic, the reacting mixture may be cooled, once the reaction has started, to maintain it at the desired temperature. An inert liquid diluent, such as a fluorocarbon, may be included in the mixture, if desired. The reaction may, in case the mixture contains substances boiling below the reaction temperature, be carried out under sufficient pressure to maintain the mixture in the liquid state. Organic products may be separated from the spent lead tetrafluoride by volatilization, by washing with a volatile solvent for the product, or in any other convenient way.

Regardless of the exact method employed in obtaining and introducing the reactant, optimum results are obtained and minimum amounts of lead tetrafluoride are required when the latter is employed in finely divided form. Satisfactory yields have been obtained while operating with lead tetrafluoride in an amount in excess of that theoretically required to accomplish perfluorination.

The exact temperature of operation varies with the phase in which the organic reactant is employed and may be from about 50° centigrade to 500° centigrade, or higher, depending upon the comparative stability of the organic compounds present in the reaction zone, and the length of time the organic reactant is to be contacted with the lead tetrafluoride. Generally speaking, the preferred temperature range is from about 100° centigrade to about 450° centigrade.

When operating in the gaseous phase, the vapor of the organic reactant is conveniently, although not necessarily, introduced into the reaction zone at an initial temperature at least as high as the boiling temperature of the reactant at the pressure employed, and the temperature may be increased gradually or step-wise to the temperature required to obtain perfluorination. Under such conditions, a high percentage of the reaction product is swept through the reaction zone and may be recovered, as by condensation. When operating at lower temperatures, there is a tendency for appreciable amounts of fluorine-containing reaction products to be deposited on the lead tetrafluoride, the walls of the reaction chamber, or otherwise to be retained within the reaction zone. When this condition exists, the lead tetrafluoride-containing reactor, or series of reactors, may be blown or swept out by passing a stream of inert gas therethrough at temperatures high enough to cause expulsion of the product.

A preferred mode of operation comprises successively subjecting the organic reactant to the action of lead tetrafluoride under conditions of progressively increasing temperature. It has been found that highly fluorinated organic compounds are very stable. A maximum of stability is obtained with perfluorination. Thus, it is desirable that the initial temperature of reaction be below the temperature of substantial decomposition of the organic reactant and that subsequent temperatures and exposure times to which the intermediate products of reaction are subjected be selected so as to be below the temperature and exposure time at which such intermediate reaction products undergo substantial decomposition. For optimum results, a balance may be struck between the maximum temperature to which the reactants and intermediates can be heated without substantial decomposition and that temperature at which fluorination is most readily accomplished.

A convenient mode of procedure includes employing a comparatively low initial temperature and increasing the temperature during the reaction as the organic constituents of the reaction mixture become more stable, with the temperature reaching a maximum at the conclusion of the fluorination reaction. This may be accomplished in several ways. For example, the crude reaction product from the initial fluorination operation may be recycled in contact with lead tetrafluoride and the reaction temperature increased with each recycling operation until the desired degree of fluorination is obtained. An alternate procedure involves confining the lead tetrafluoride and organic reactant within a reaction zone and progressively increasing the temperature as the reaction approaches completion. A further and preferred mode of operation includes passing the reactant through a plurality of fluorination units, e. g., two or more tubes packed with lead tetrafluoride and connected in series, with each successive unit or reaction zone being maintained at a temperature higher than that of the preceding unit. In any event, by operating at progressively increasing reaction temperatures, perfluorination may be accomplished with a minimum of decomposition. A similar result is obtained when partially fluorinated organic compounds are employed as reactants to form perfluorinated compounds. In certain instances, the presence in the molecule of established fluorine atoms increases the stability of the organic reactant so as to accomplish the desired result without such decomposition as might otherwise be expected under the conditions of reaction. In continuous operation it is usually desirable to provide means for cooling the reaction chamber.

When operating in the gaseous phase, the effluent gases from the reaction chamber may be collected and organic fluorine compounds therein recovered in any convenient manner; as by fractional condensation, by condensing and distilling, by scrubbing with an inert organic liquid, e. g., with a fluorocarbon, to dissolve organic fluorine compounds or with water to dissolve hydrogen fluoride, by adsorption of certain of the gaseous constituents on an inert solid, or in any of a number of other ways apparent to those familiar with the art. When the fluorination reaction involves the replacement of hydrogen with fluorine, hydrogen fluoride is formed as a valuable by-product which may, if desired, be recovered in anhydrous form by cooling the effluent gases, e. g., in a condenser cooled to a temperature at least sufficiently low to condense hydrogen fluoride, and separating liquid hydrogen fluoride, which is substantially insoluble in liquid organic fluorine compounds, from the condensate. Liquid phase fluorination products may be separated from hydrogen fluoride in similar manner or hydrogen fluoride may be volatilized from the liquid organic fraction and condensed separately. After the fluorine-containing reaction products have been collected, they are conveniently reduced to liquid or solid form and purified according to methods well known in the art. One mode of operation particularly applicable to water-insoluble and water-stable derivatives comprises successively washing the crude product with dilute aqueous alkali and water and thereafter fractionally distilling or steam-distilling.

Since the highest possible degree of fluorination is desired, i. e., perfluorination, it is frequently advantageous to recirculate or recycle the crude fluorination product initially obtained. This may be accomplished by contacting such crude product in either the liquid or vapor state with fresh lead tetrafluoride. A particularly convenient method of operation includes regenerating the lead tetrafluoride originally employed and recontacting the initial product of reaction therewith. Such regeneration is preferably carried out by contacting the spent or partially spent lead tetrafluoride with gaseous fluorine at temperatures above about 200° centigrade. This procedure of regeneration and recycling may be repeated as many times as is necessary to obtain perfluorination. A similar result is obtained by use of a plurality of fluorination units connected in series.

The time required to accomplish perfluorination varies with the temperature employed, the organic reactant selected, the phase of operation, and the state of subdivision of the lead tetrafluoride. A contact period between the organic reactant and lead tetrafluoride of from a few seconds to several hours may be productive of the desired perfluorination.

The procedures as herein set forth may be carried out at subatmospheric, superatmospheric, or atmospheric pressure. The preferred temperatures of reaction will vary somewhat with the pressure employed.

The preferred embodiment of the present invention concerns operation with organic compounds containing at least two carbon atoms. While single carbon atom compounds such as methane, formaldehyde, methylene chloride, etc., are included within the scope of the broad invention, certain differences with respect to the mode and mechanics of operation as between these compounds and those containing a plurality of carbon atoms have been found to be significant.

The preparation of fluorocarbons, except for carbon tetrafluoride, has been most difficult according to hitherto known methods of operation. In the present method for preparing fluorocarbons the organic reactant may be a hydrocarbon or a partially or completely halogenated hydrocarbon, provided only that such reactant contain either an unsaturated carbon to carbon linkage or at least one hydrogen atom or one halogen atom other than fluorine attached to carbon. Partially fluorinated hydrocarbons are included within this group of reactants and, in certain cases, may constitute a preferred embodiment of the invention.

The following examples are purely illustrative and are not to be construed as limiting:

*Example 1.—Fluorination of benzene*

Four 30-inch lengths of 1.25 inch diameter copper tubing, packed with lead tetrafluoride and connected in series, were heated to a temperature of 200° centigrade. Ten grams of benzene was passed through this reactor over a period of two hours, the effluent products being collected in an ice-cooled condenser containing aqueous potassium hydroxide. The reactor was then swept with nitrogen whereby a total of thirteen grams of liquid product was recovered. This product was washed with water, dried and rectified to obtain a fluorinated cyclohexane containing 67.2 per cent by weight of fluorine.

The lead tetrafluoride residue was regenerated by blowing the reactor with gaseous fluorine at 300°–350° centigrade. Twenty grams of the fluorinated product obtained as described above was recycled through the four-unit copper reactor at 400° centigrade over a period of two hours. The reactor was then flushed with nitrogen for two hours and the effluent gases condensed. Fifteen grams of a water immiscible product was recovered from the crude condensate by washing with aqueous sodium hydroxide and with water. On distillation, the major portion of this mixture boiled at 50° centigrade. This fraction was found to be perfluorocyclohexane melting at 49° centigrade and containing 76 per cent by weight of fluorine.

*Example 2.—Fluorination of acetone*

Twenty-five milliliters of acetone was vaporized and passed slowly through a sheet copper reaction chamber 1 inch by 8 inches by 5 feet in size and packed with finely divided lead tetrafluoride. The reactor and contents were maintained at 170° centigrade throughout the addition of the acetone. The reaction chamber was then blown with nitrogen, and the effluent gases condensed in a cooled trap to obtain a highly fluorinated aliphatic liquid boiling below 20° centigrade and containing carbon tetrafluoride.

*Example 3.—Fluorination of acetophenone*

An operation similar to that described in Example 2 was carried out in which twenty-five milliliters of acetophenone was passed over lead tetrafluoride at 260° centigrade. The mixed reaction products were collected, neutralized and washed with water, and then fractionally distilled to obtain a low boiling fraction consisting principally of perfluoro methyl cyclohexylketone, a medium boiling fraction containing 60.6 per cent by weight of fluorine and a higher boiling fraction containing 45.8 per cent by weight of fluorine.

*Example 4.—Fluorination of benzotrifluoride*

One hundred nine grams of benzotrifluoride was passed in vapor form during a period of five hours through a mass of finely divided lead tetrafluoride contained in the reactor described in Example 2. The lead tetrafluoride was maintained at a temperature of about 300° centigrade during the reaction period. The reactor was then flushed thoroughly with nitrogen. The effluent gases from the reaction and flushing steps were cooled and there was thus condensed 216 grams of a water-white liquid containing 72.6 per cent by weight of fluorine. The lead tetrafluoride residue in the reactor was regenerated by heating to 500° centigrade and passing fluorine through the reactor. Two hundred and fifteen grams of the fluorine-containing product obtained by the method just described was passed, during a period of three hours, through the reactor containing the regenerated lead tetrafluoride at a temperature of about 360° centigrade. Upon flushing the reactor with nitrogen and cooling the effluent gases as before, there was obtained a total of 205 grams of a liquid consisting principally of perfluoro-methylcyclohexane.

*Example 5.—Fluorination of cyclohexane*

Cyclohexane is recycled repeatedly through a copper tube containing lead tetrafluoride at a temperature of from 225° to 300° centigrade. A product consisting principally of perfluorocyclohexane boiling at 50° to 51° centigrade is obtained.

*Example 6.—Fluorination of nonafluoromesitylene*

Nonafluoromesitylene is fluorinated by passing it, in the vapor state, through a reactor filled with a large excess of lead tetrafluoride at about 250° centigrade and then recycling the product through the reactor at about 350° centigrade. Perfluoro-1.3.5-trimethylcyclohexane is obtained in high yield.

*Example 7.—Fluorination of heptane*

Normal heptane is passed through a reactor containing lead tetrafluoride at 150° centigrade. The product obtained by cooling the effluent gases contains 60 per cent of fluorine. Recirculation of this product at 200° centigrade results in the conversion of most of it to perfluoroheptane.

Other organic substances which may be reacted with lead tetrafluoride substantially as disclosed in the preceding examples to produce perfluorinated compounds include isobutane, isobutylene, isooctane, cetane, propionic acid, normal butyl ether, hexadecane, ethylene, isobutylene, diethylbenzene, isopropylbenzene, mixed chlorofluoroxylenes, diphenyl, naphthalene, styrene, hexafluoroxylene, nonafluoromesitylene, phenetole, ethyl acetate, acetic anhydride, isopropyl ether, paraffin wax, coal tar fractions, nitroparaffins, nitroaromatics, polyalkylbenzenes, carbon tetrachloride, methylene chloride, other halogenated aliphatic compounds, heterocyclic compounds, alicyclic compounds, halogenated heterocyclic and alicyclic compounds, chloronaphthalene and other halogenated fused-ring systems, diphenylbenzenes, "Santowax" and similar products, various petroleum fractions, and polynuclear hydrocarbons.

We claim:

1. The process which includes reacting a compound selected from the group consisting of alkanes and alkenes with lead tetrafluoride at a temperature in the range between about fifty degress centigrade and that temperature at which substantial decomposition of the organic reactant occurs, for a period of time sufficient to convert at least a portion of the starting organic compound to a perfluoroparaffin.

2. In the preparation of a perfluoroparaffin, the step of reacting an alkane with lead tetrafluoride at a temperature in the range between about 50 degrees centigrade and that temperature at which substantial decomposition of the organic reactants occurs for a sufficient period of time to convert at least a portion of the alkane to a perfluoroparaffin.

3. The process which includes reacting an alkene with lead tetrafluoride at a temperature in the range between about 50 degrees centigrade and that temperature at which substantial decomposition of the organic reactants occurs for a sufficient period of time to convert at least a portion of the alkene to a perfluoroparaffin.

EARL T. McBEE.
RICHARD MARION ROBB.

REFERENCES CITED

The following references are of record in the file of this patent:

UNITED STATES PATENTS

| Number | Name | Date |
|---|---|---|
| 1,914,135 | Lacy | June 13, 1933 |
| 2,004,932 | Daudt et al. | June 18, 1935 |
| 2,013,035 | Daudt et al. | Sept. 13, 1935 |
| 2,024,008 | Midgley et al. | Dec. 10, 1935 |
| 2,062,743 | Daudt et al. | Dec. 1, 1936 |
| 2,192,143 | Midgley et al. | Feb. 27, 1940 |
| 2,220,713 | Grosse et al. | Nov. 5, 1940 |

FOREIGN PATENTS

| Number | Country | Date |
|---|---|---|
| 214,293 | Great Britain | Apr. 14, 1924 |
| 429,591 | Great Britain | May 28, 1935 |
| 3,141 of 1931 | Australia | Jan. 20, 1933 |
| 786,123 | France | June 3, 1935 |

OTHER REFERENCES

Dimroth et al.: "Berichte der deutchen Chemischen Gesellschaft," 64 B, 516–522 (1931).

Henne et al.: "J. A. C. S.," vol. 63, pages 3478–79 (1941).

Wartenberg: "Zeitsch. anorg. allgem. Chem.," vol. 244, pages 337–347 (1940).

Moissan: "Comptes rendus," vol. 130, pages 622–627 (1900).

Ruff and Giese: "Zeit. Anorg. Allgem. Chem.," vol. 219, pages 143 to 148 (1934).